United States Patent
Kim (10) Patent No.: US 8,716,941 B2
(45) Date of Patent: May 6, 2014

(54) TERMINAL AND BRIGHTNESS CONTROL METHOD THEREOF

(75) Inventor: Jin Soo Kim, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 13/297,523

(22) Filed: Nov. 16, 2011

(65) Prior Publication Data

US 2012/0169236 A1 Jul. 5, 2012

(30) Foreign Application Priority Data

Dec. 29, 2010 (KR) ........................ 10-2010-0137778

(51) Int. Cl.
*H05B 37/02* (2006.01)
*H05B 33/08* (2006.01)

(52) U.S. Cl.
CPC .................................. *H05B 33/0872* (2013.01)
USPC ............................ 315/127; 315/158; 455/566

(58) Field of Classification Search
CPC ........................ H05B 33/0872; H05B 33/0895
USPC ................................... 315/127, 158; 455/566
See application file for complete search history.

(56) References Cited

U.S. PATENT DOCUMENTS

| | | | |
|---|---|---|---|
| 2009/0298548 A1* | 12/2009 | Kim et al. | 455/566 |
| 2010/0240418 A1* | 9/2010 | Matoba | 455/566 |
| 2012/0032972 A1* | 2/2012 | Hwang | 345/592 |
| 2013/0050068 A1* | 2/2013 | Inoue et al. | 345/102 |

* cited by examiner

*Primary Examiner* — Don Le
(74) *Attorney, Agent, or Firm* — Jefferson IP Law, LLP (57) ABSTRACT

A terminal and a brightness control method thereof are provided. The terminal includes an illumination sensor for measuring peripheral illumination of the terminal, a proximity sensor for detecting an object within a preset distance, a memory for storing a brightness table including data for controlling brightness of a display unit corresponding to the measured illumination, the display unit for displaying and for changing a brightness of the display unit under control of a controller, and the controller for controlling the display unit to change the brightness according to the measured illumination and the brightness table when the object is not detected. The terminal and brightness control method thereof provide a more suitable screen to a user.

18 Claims, 6 Drawing Sheets

| PERIPHERAL ILLUMINATION(lx) | ALLOWABLE SCREEN BRIGHTNESS(cd/m$^2$) | RESETTING SCREEN BRIGHTNESS(cd/m$^2$) |
|---|---|---|
| FROM 0 TO 30 | FROM 0.05 TO 0.07 | 0.06 |
| FROM 30 TO 50 | FROM 0.06 TO 0.08 | 0.07 |
| FROM 50 TO 80 | FROM 0.07 TO 0.09 | 0.08 |
| FROM 80 TO 100 | FROM 0.08 TO 0.10 | 0.09 |
| ... | ... | ... |
| GREATER THAN 1,000 | GREATER THAN 0.20 | 0.20 |

FIG. 2B

| PERIPHERAL ILLUMINATION(lx) | ALLOWABLE SCREEN BRIGHTNESS | RESETTING SCREEN BRIGHTNESS |
|---|---|---|
| FROM 0 TO 30 | CONTROL VALUE1, CONTROL VALUE2, CONTROL VALUE3 | CONTROL VALUE2 |
| FROM 30 TO 50 | CONTROL VALUE2, CONTROL VALUE3, CONTROL VALUE4 | CONTROL VALUE3 |
| FROM 50 TO 80 | CONTROL VALUE3, CONTROL VALUE4, CONTROL VALUE5 | CONTROL VALUE4 |
| FROM 80 TO 100 | CONTROL VALUE4, CONTROL VALUE5, CONTROL VALUE6 | CONTROL VALUE5 |
| ... | ... | ... |
| GREATER THAN 1,000 | CONTROL VALUE14, CONTROL VALUE15, CONTROL VALUE16 | CONTROL VALUE15 |

TERMINAL AND BRIGHTNESS CONTROL METHOD THEREOF

PRIORITY

This application claims the benefit under 35 U.S.C. §119(a) of a Korean patent application filed on Dec. 29, 2010 in the Korean Intellectual Property Office and assigned Serial No. 10-2010-0137778, the entire disclosure of which is hereby incorporated by reference.

BACKGROUND OF THE INVENTION

1. Field of the Invention

The present invention relates to a terminal and a brightness control method thereof More particularly, the present invention relates to a terminal removing brightness control error due to shielding of a user and a brightness control method thereof.

2. Description of the Related Art

A mobile terminal of the related art maintains a constant brightness of a screen regardless of a peripheral environment. Accordingly, for a constant brightness of the screen suited to a dimly lit environment, while a user can see the screen well in the dimly lit environment, the user cannot see the screen in a brightly lit environment. Conversely, for a constant brightness of the screen suited to the brightly lit environment, while the user can see the screen well in both the brightly lit and dimly lit environments, the user's eyes become fatigued in the dimly lit environment because the screen is excessively bright.

In order to address such a problem, mobile terminals of the related art have an automatic brightness control function that adjusts the brightness of the screen so as to be suited to a peripheral environment. The mobile terminals have an illumination sensor therein and provide the automatic brightness control function using the illumination sensor. The illumination sensor controls the brightness of the screen according to an environment in such a way that the screen is bright in a brightly lit environment but is dark in a dimly lit environment.

Meanwhile, owing to the trend in convergence and a reduction in cost, an integral sensor of a proximity sensor and an illumination sensor may be mounted in the mobile phone. However, when a body of a user or other object inadvertently covers the illumination sensor, there is a problem in that the brightness of the screen may be incorrectly adjusted to be dark. Accordingly there is a need to improve the automatic brightness control function based on characteristics of an integral sensor.

SUMMARY OF THE INVENTION

Aspects of the present invention are to address the above-mentioned problems and/or disadvantages and to provide at least the advantages described below. Accordingly, an aspect of the present invention is to provide a terminal providing suitably bright screen to a user and a brightness control method thereof.

Another aspect of the present invention is to provide a terminal minimizing brightness control error due to a user covering an illumination sensor, and a brightness control method thereof.

In accordance with an aspect of the present invention, a terminal is provided. The terminal includes an illumination sensor for measuring peripheral illumination of the terminal, a proximity sensor for detecting an object within a preset distance, a memory for storing a brightness table including data for controlling brightness of a display unit corresponding to the measured illumination, the display unit for displaying and for changing a brightness of the display unit under control of a controller, and the controller for controlling the display unit to change the brightness according to the measured illumination and the brightness table when the object is not detected.

In accordance with another aspect of the present invention, a method for controlling brightness of a display unit in a terminal is provided. The method includes measuring peripheral illumination of the terminal, determining whether an object is detected within a preset distance, and controlling brightness of the display unit according to the measured illumination when the object is not detected within the preset distance.

Exemplary embodiments of the present invention provide a suitably bright screen to a user. Further, exemplary embodiments of the present invention minimize a brightness control error due to a user covering an illumination sensor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a terminal 100 and a brightness control method of the terminal 100 according to exemplary embodiments of the present invention are described with reference to the accompanying drawings.

Figure 1:
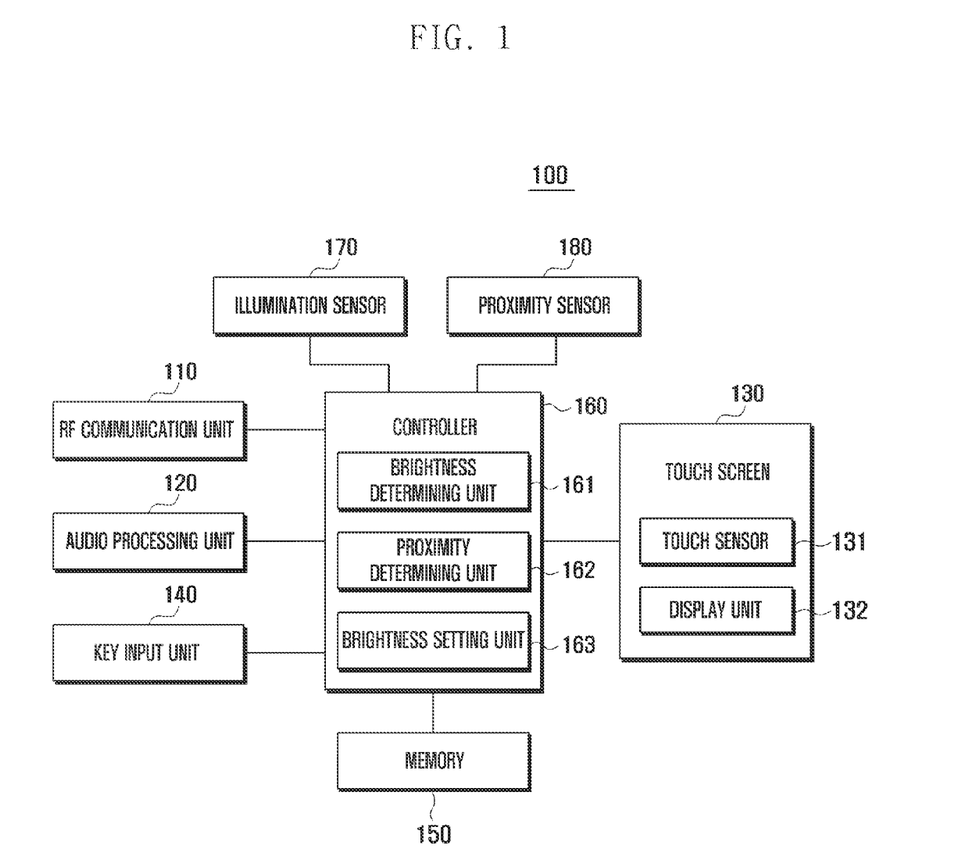
FIG. 1 is a block diagram illustrating a configuration of a terminal according to an exemplary embodiment of the present invention.

FIG. 1 is a block diagram illustrating a configuration of a terminal according to an exemplary embodiment of the present invention.

Referring to FIG. 1, the terminal 100 includes a Radio Frequency (RF) communication unit 110, an audio processing unit 120, a touch screen 130, a key input unit 140, a memory 150, a controller 160, an illumination sensor 170, and a proximity sensor 180.

The RF communication unit 110 performs transmitting and receiving functions of corresponding data for RF communication. The RF communication unit 110 may include a transmitter (not shown) for up-converting a frequency of a transmitted signal and for amplifying the signal, a receiver (not shown) for low-noise-amplifying a received signal and for down-converting the signal. Further, the RF communication unit 110 receives data through an RF channel and outputs the received data to the controller 160. The RF communication unit 110 may transmit data output from the controller 160 through the RF channel.

The audio processing unit 120 may be configured by a CODer DECoder (CODEC). The CODEC may include a data CODEC for processing packet data and an audio CODE for processing an audio signal. The audio processing unit 120 converts a digital audio signal into an analog audio signal using the audio CODEC, and plays the analog audio signal using a speaker. The audio processing unit 120 converts an analog audio signal input from a microphone into a digital audio signal using the audio CODEC.

The touch screen 130 includes a touch sensor 131 and a display unit 132. The touch sensor detects a touch input of a user. The touch sensor 131 may be configured by a touch sensor such as one of a capacitive overlay type touch sensor, a resistive overlay type touch sensor, an infrared beam type touch sensor, and a pressure sensor. Besides the foregoing sensors, the touch sensor 131 may be configured by various types of sensor devices capable of detecting contact or pressure of an object. The touch sensor 131 detects a touch input of a user to generate a detecting signal and transmits the generated detecting signal to the controller 160. The detecting signal contains coordinate data corresponding to an input of a touch by a user. When the user inputs a touch location moving operation, the touch sensor 131 generates and transmits a detecting signal, having coordinate data corresponding to a touch location moving path, to the controller 160.

The display unit 132 may be configured by a Liquid Crystal Display (LCD), an Organic Light Emitting Diode (OLED), an Active Matrix OLED (AMOLED), etc. The display unit 132 visibly provides a menu of the terminal, input data, function setting information, and a variety of other information to a user. The display unit 132 executes a function for outputting a booting screen, an idle screen, a menu screen, a call screen, and other application screens of the terminal 100.

In particular, the display unit 132 may vary brightness of a screen according to a control signal of a brightness setting unit 163 of the controller 160. The controller 160 may control brightness of the display unit 132 by adjusting at least one of a voltage and an electric current applied to the display unit 132, or a resistance of a variable resistor connected thereto. Variation in the brightness of the display unit 132 implemented by an LCD is a well known technique according to a control signal, and thus a detailed description thereof is omitted herein for conciseness in explanation. However, a description of which case and brightness the display unit 132 is operated in will be given below in the description of the controller 160. The following is an exemplary operation of controlling screen brightness with reference to FIG. 3 and FIG. 4.

The terminal 100 of an exemplary embodiment of the present invention may be configured to include the touch screen described above. However, it should be noticed that an exemplary embodiment of the present invention is not applied to only a terminal 100 with the touch screen. When the present invention is applied to a terminal without the touch screen according to another exemplary embodiment of the present invention, the touch screen 130 shown in FIG. 1 may be modified to execute only a function of the display unit 132.

The key input unit 140 receives a key operation of a user for controlling the terminal 100, and generates and transfers an input signal to the controller 160. The key input unit 140 may be configured by either a key pad including numeral keys and arrow keys, or a predetermined function key provided at one side of the terminal. In an exemplary embodiment of the present invention, the key input unit 140 may be omitted in a terminal capable of performing all operations by only the touch screen 130.

The memory 150 may store programs and data used for an operation of the terminal, and may be divided into a program area and a data area. The program area may store a program controlling an overall operation of the terminal 100, an Operating System (OS) for booting the terminal 100, an application program used for playback of multimedia contents, or other optional functions of the terminal 100, such as a camera function, a sound playing function, or an image or moving image playing function. The data area stores data created according to use of the terminal 100, for example, images, moving images, phone-books, and audio data.

In particular, the memory 150 stores a brightness table containing peripheral illumination and data for controlling brightness of the display unit 132 corresponding to the peripheral illumination. For example, the data for controlling the brightness of the display unit 132 may be an IDentification (ID) indicating a brightness or a brightness value of the display unit 132. The data for controlling the brightness of the display unit 132 may become various types of numerals and an ID thereof, such as at least one of a voltage and an electric current applied to the display unit 132, or resistance of a variable resistor connected to the display unit 132, used for controlling the brightness of the display unit 132. The data will be described below with reference to FIG. 2A and FIG. 2B.

Figure 2A:
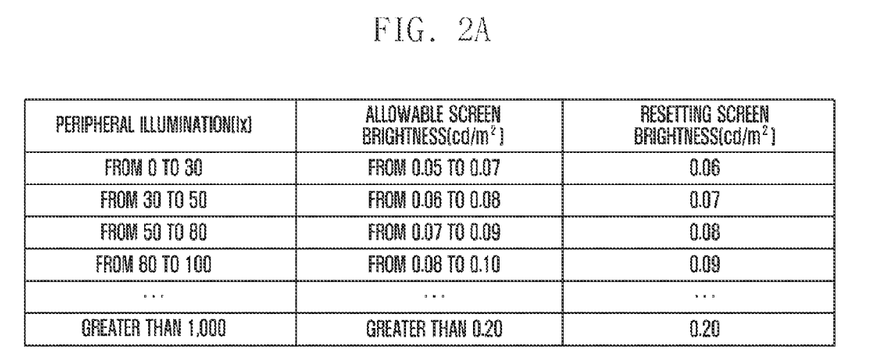
FIG. 2A is a view illustrating a brightness table according to an exemplary embodiment of the present invention.

FIG. 2A is a view illustrating a brightness table according to an exemplary embodiment of the present invention.

For example, the case where the peripheral illumination ranges from 0 lx to 30 lx is displayed at a second row of FIG. 2A. It is assumed that the peripheral illumination measured by the illumination sensor 170 ranges from 0 lx to 30 lx. In this case, when the current screen brightness (luminance) of a display unit 132 ranges from 0.05 cd/cm² to 0.07 cd/cm², the screen brightness of the display unit 132 is maintained. Conversely, when the current screen brightness of a display unit 132 does not range from 0.05 cd/cm² to 0.07 cd/cm², it is reset to a screen brightness designated at a resetting time, namely, 0.06 cd/cm². That is, an "allowable screen brightness" field is a field used to determine whether to change screen brightness according to the measured peripheral illumination. Further, a "resetting screen brightness" field is a field used to determine whether screen brightness should be reset when changing the screen brightness. The screen brightness is discussed herein under the assumption that an entire screen is white.

Illumination and screen brightness ranges in the exemplary embodiment of FIG. 2A are illustrated by way of example. Different illumination and screen brightness ranges may be used in various real world implementations. Further, different units may be used as a unit of screen brightness and a unit of illumination. An lm or a cd may be used as the unit of screen brightness instead of cd/cm2.

Although screen brightness itself is stored in a brightness table in an exemplary embodiment of FIG. 2A, an ID (brightness 1, brightness 2) of the screen brightness may be stored instead of the screen brightness. Meanwhile, in place of the screen brightness, a control value of the display unit 132 corresponding to the screen brightness, or an ID thereof, may be stored in the brightness table as shown in FIG. 2A.

Figure 2B:
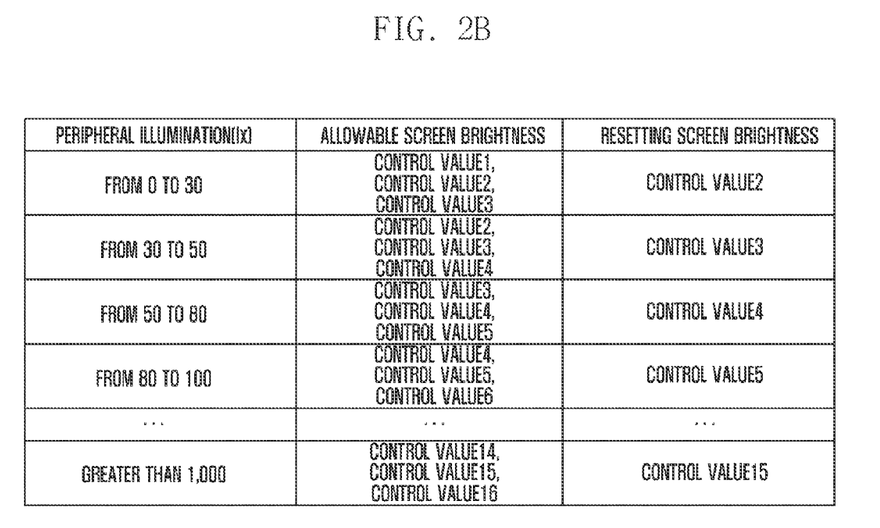
FIG. 2B is a view illustrating a brightness table according to another exemplary embodiment of the present invention.

FIG. 2B is a view illustrating a brightness table according to another exemplary embodiment of the present invention. In the other exemplary embodiment of FIG. 2B, peripheral illumination, control values allowed according to the peripheral illumination, and control values used at a resetting time in the peripheral illumination are stored in a brightness table. In order to control brightness of the display unit 132, at least one of a voltage and an electric current applied to the display unit 132, or resistance of a variable resistor connected thereto, should be adjusted. Control values 1 to 15 refer to a control value necessary to control brightness of the display unit 132, respectively. Consequently, respective control values corresponding to respective brightness of the display unit 132. Here, IDs (control value 1 to control 15) of control values are recorded in the brightness table. However, control values themselves may be stored in the brightness table.

Hereinafter, it is assumed that the brightness table is configured as shown in FIG. 2A. However, it is apparent to a person having ordinary skill in the art that the same manner to be described below is applicable although the brightness table is configured as shown in FIG. 2B or different values for controlling the brightness of the display unit are recorded in the brightness table.

Referring back to FIG. 1, the illumination sensor 170 measures peripheral illumination of a terminal 100. The illumination sensor 170 may measure the peripheral illumination of the terminal 100 periodically or under the control of the controller 160. The illumination sensor 170 measures illumination, namely, an amount of light. The illumination sensor 170 may be implemented using, for example, a cadmium sulfide (CdS) photoconductive cell. The CdS photoconductive cell operates in such a way that internal resistance changes according to an amount of light. That is, the CdS photoconductive cell uses a principle that is similar to the principle of an insulator impeding the flow of an electric current when there is no light, and internal resistance thereof becomes small and thereby allows the electric current to flow when receiving light. The CdS photoconductive cell is an example of the illumination sensor 170, and various sensors capable of measuring an amount of light may be used as the illumination sensor 170. A detailed configuration and an operation method of the illumination sensor 170 is a known technology, and thus a detailed description is omitted for convenience in explanation.

The proximity sensor 180 determines whether there is an object approaching or existing near to the terminal 100. The proximity sensor 180 detects at least one object within a preset distance of the terminal 100 periodically or under the control of the controller 160.

The proximity sensor refers to a switch that detects the presence of an object approaching or existing near a detection surface of a sensor using an electromagnetic force without mechanical contact. There are a magnetic type proximity sensor, a magnetic saturation type proximity sensor, a high frequency oscillating type proximity sensor, a differential coil type proximity sensor, and a capacitive type proximity sensor as exemplary types of a proximity sensor. Operation methods of respective types of the proximity sensor are a known technology, and thus a detailed description thereof is omitted for convenience in explanation.

The controller 160 controls an overall operation with respect to respective structural elements of the terminal 100. In particular, the controller 160 controls the brightness of the display unit 132. The controller 160 receives the measured illumination from the illumination sensor 170. The controller 160 searches for a reference brightness of the display unit 132 corresponding to the measured illumination received from the illumination sensor 170 from a brightness table of the memory 150. If the found reference brightness of the display unit 132 corresponding to the measured illumination is identical to the currently set brightness of the display unit 132, the controller 160 maintains the currently set brightness of the display unit 132. If the found reference brightness of the display unit 132 corresponding to the measured illumination differs from the currently set brightness of the display unit 132, the controller 160 receives object detecting information from the proximity sensor 180. That is, the controller 160 determines whether the proximity sensor 180 detects an object within a preset distance. If an object proximate to the terminal 100 is detected, because illumination changes due to a user's fingers or other objects covering an illumination sensor, the controller 160 maintains the currently set brightness of the display unit 132. Conversely, if an object proximate to the terminal 100 is not detected, the controller 160 sets the brightness of the display unit 132 to a value corresponding to the measured illumination.

The controller 160 may include a brightness determining unit 161, a proximity determining unit 162, and a brightness setting unit 163.

The brightness determining unit 161 searches for a reference brightness corresponding to the measured illumination from the illumination sensor 170 from the brightness table of the memory 150 and determines whether currently set brightness of the display unit 132 is identical with the found reference brightness. The brightness determining unit 161 transfers the determination result to the proximity determining unit 162 or the brightness setting unit 163. If the currently set brightness of the display unit 132 is identical with the found reference brightness, the brightness determining unit 161 maintains the set brightness of the display unit 132. In remaining cases, the reference brightness may be set as brightness of the display unit 132.

The proximity determining unit 162 determines whether the proximity sensor 180 detects an object within a preset distance. The proximity determining unit 162 transfers the determination result to the brightness determining unit 161 or the proximity determining unit 163. When the proximity sensor 180 detects the object within the preset distance, set brightness of the display unit 132 is maintained regardless of the determination of the brightness determining unit 161. Conversely, when the proximity sensor 180 does not detect the object within the preset distance, brightness suitable for the measured illumination may be set as the brightness of the display unit 132.

When an object is not detected within a preset distance of the terminal 100 and the set brightness of the display unit 132 differs from found reference brightness corresponding to the measured illumination from the illumination sensor 170, the brightness setting unit 163 sets the found reference brightness as the brightness of the display unit 132. In remaining cases, the brightness of the display unit 132 is maintained.

Operations of the brightness determining unit 161, the proximity determining unit 162, and the brightness setting unit 163 of the controller 160 will be described below with reference to FIG. 3 and FIG. 4.

Figure 3:
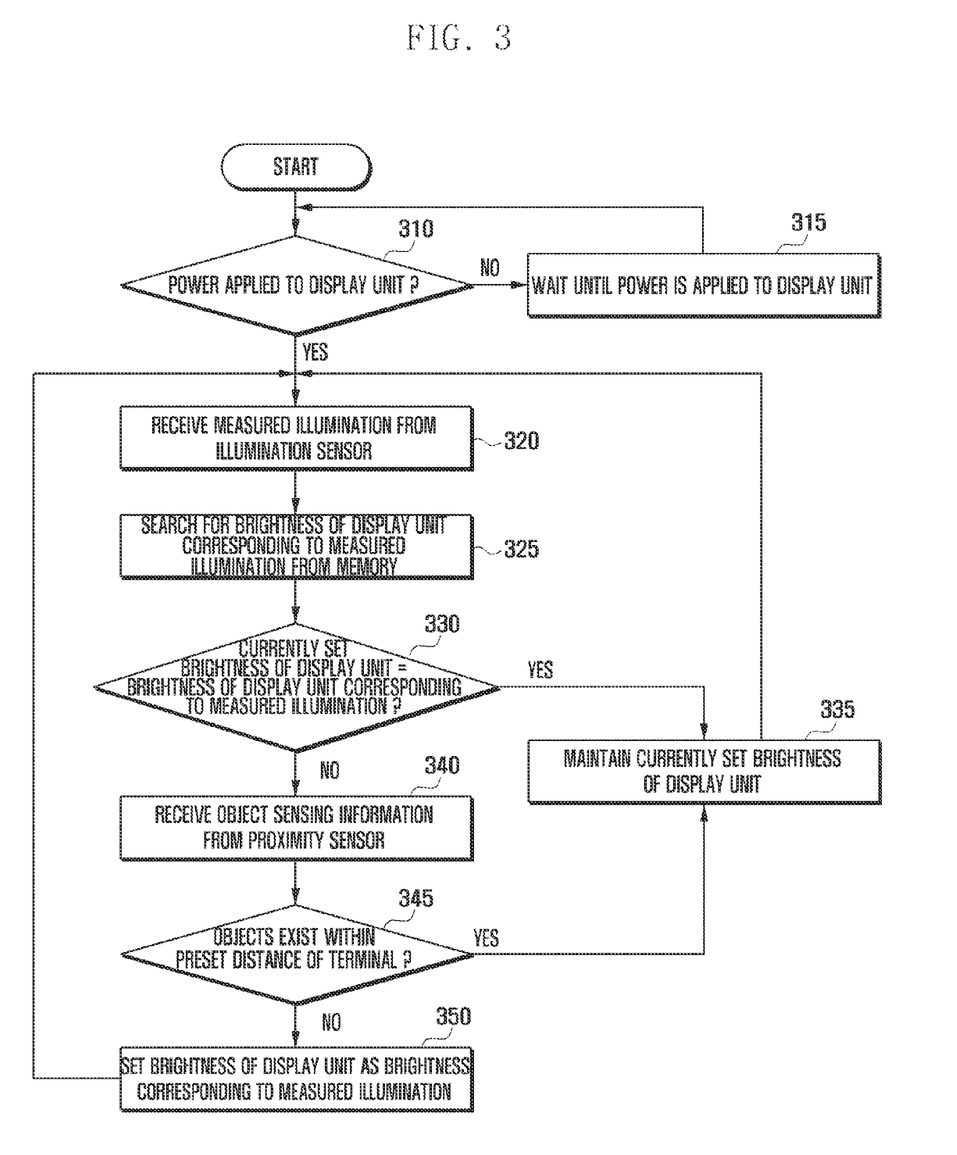
FIG. 3 is a flowchart illustrating a brightness control method according to a first exemplary embodiment of the present invention.

FIG. 3 is a flowchart illustrating a brightness control method according to a first exemplary embodiment of the present invention.

Referring to FIG. 3, a controller 160 determines whether power is applied to a display unit 132 in step 310. That is, the controller 160 determines whether the display unit 132 is turned-on. When an event occurs, for example, when the terminal 100 receives input or a call request of a user while power of the display unit 132 is cut-off in an idle state, it may apply power to the display unit 132 to enable the display unit 132 to display information. If the controller 160 determines that power is applied to the display unit 160 at step 310, the process proceeds to step 320. Conversely, if power is not applied to the display unit 160, the controller 160 waits until the power is applied to the display unit 132 in step 315 and returns to step 310.

A brightness determining unit 161 of the controller 160 receives measured illumination from an illumination sensor 170 in step 320. As illustrated above, the illumination sensor 170 may measure illumination periodically or under the control of the bright determining unit 161 and transfer the measured illumination to the brightness determining unit 161.

The brightness determining unit 161 of the controller 160 searches for a reference brightness of the display unit 132 corresponding to the measured illumination from a brightness table of a memory 150 in step 325. The brightness determining unit 161 may search for at least one of allowable screen brightness in the measured illumination or screen brightness used when resetting the illumination. Referring to FIG. 2A and FIG. 2B, as illustrated previously, "allowable screen brightness" and "resetting screen brightness" with respect to illumination are stored in the brightness table. The foregoing exemplary embodiment has illustrated that IDs of screen brightness, control values for implementing the screen brightness, and IDs of the control values in the place of the screen brightness may be used in the brightness table.

In this exemplary embodiment, the "allowable screen brightness" and the "resetting screen brightness" may be combined as one combination field, which have the same value. In this case, if one combination field has a predetermined range, an intermediate value, a minimum value, or a maximum value of the predetermined range may be used as the resetting screen brightness. Conversely, if the combination field has one value, the allowable screen brightness may be a value within a range less than a preset difference from a value of the combination field.

The brightness determining unit 161 determines whether currently set brightness of the display unit 132 is identical to the found reference brightness of the display unit 132 corresponding to the measured illumination in step 330.

Referring to exemplary embodiment of FIG. 2A, it is assumed that peripheral illumination is measured with 40 lx. In this case, allowable screen brightness ranges from 0.06 $cd/cm^2$ to 0.08 $cd/cm^2$.

The currently set brightness of the display unit 132 ranging from 0.06 $cd/cm^2$ to 0.08 $cd/cm^2$ indicates a case where the currently set brightness of the display unit 132 is identical with the found reference brightness of the display unit 132 corresponding to the measured illumination. A user determines that current brightness of the display unit 132 is suitable and maintains the currently set brightness of the display unit 132 in step 335.

Conversely, the currently set brightness of the display unit 132 having 0.09 $cd/cm^2$ indicates a case where currently set brightness of the display unit 132 differs from the found reference brightness of the display unit 132 corresponding to the measured illumination. In this case, because the currently set brightness of the display unit 132 is too bright or dark, the process proceeds to step 340. At this time, the brightness determining unit 161 transfers information indicating that the currently set brightness of the display unit 132 differs from the found reference brightness of the display unit 132 corresponding to the measured illumination to the proximity determining unit 162.

In a modified exemplary embodiment of the present invention, step 325 and step 330 may be substituted by a construction that compares illumination measured at a recent measuring time point with that of a previously changed time point of a display unit at the previous measuring time point, and determines whether a change in brightness of the display unit is needed according to the comparison of the illumination. However, there should be a reference for determining that the brightness of the display unit becomes unsuitable as the illumination changes in order to apply the exemplary embodiment. For example, if the brightness of the display unit differs from the previously changed brightness of the display unit by more than 20 lx, it may be determined to need to be changed.

The proximity determining unit 162 of the controller 160 receives object detecting information from the proximity sensor 180 in step 340. The proximity sensor 180 detects whether an object exists within a preset distance of a terminal 100 periodically or under the control of the proximity determining unit 162, and transfers detecting information to the proximity determining unit 162. Here, the preset distance is a distance for determining whether a user covers the illustration sensor 170, and for example may be 1 cm. Here, since the illustration sensor 170 is determined to be covered by proximity detecting of the proximity sensor 180, the proximity sensor 180 and the illumination sensor 170 are integrally implemented or the proximity sensor 180 and the illumination sensor 170 are located within a preset distance, for example, 0.5 cm to improve performance.

The proximity determining unit 162 determines whether an object exists within a preset distance of the terminal 100 according to the received object detecting information in step 345. When the object exists within a preset distance of the terminal 100, the proximity determining unit 162 determines that the user covers the illumination sensor 170 and maintains the currently set brightness of the display unit 132 in step 335. This is because real peripheral illumination of the terminal 100 may not be measured if the user covers the illumination sensor 170. Thereafter, the process returns to step 320. Conversely, when the object does not exist within the preset distance of the terminal 100, the process proceeds to step 350. At this time, the proximity determining unit 162 transfers information indicting that the object does not exist within the preset distance of the terminal 100 to the brightness setting unit 163.

The brightness setting unit 163 sets the brightness corresponding to the measured illumination as the brightness of the display unit 132 in step 350. For example, if the peripheral illumination measured by the illumination sensor 170 is 40 lx, the brightness setting unit 163 may set the brightness of the display unit 132 to 0.07 cd/cm$^2$. Thereafter, the process returns to step 320.

The exemplary embodiment of FIG. 3 is a case where a measuring result of the illumination sensor 170 is firstly applied, and a detecting result of the illumination sensor 180 is applied afterwards. An exemplary embodiment of FIG. 4 presents a contrary case to that of FIG. 3.

Figure 4:
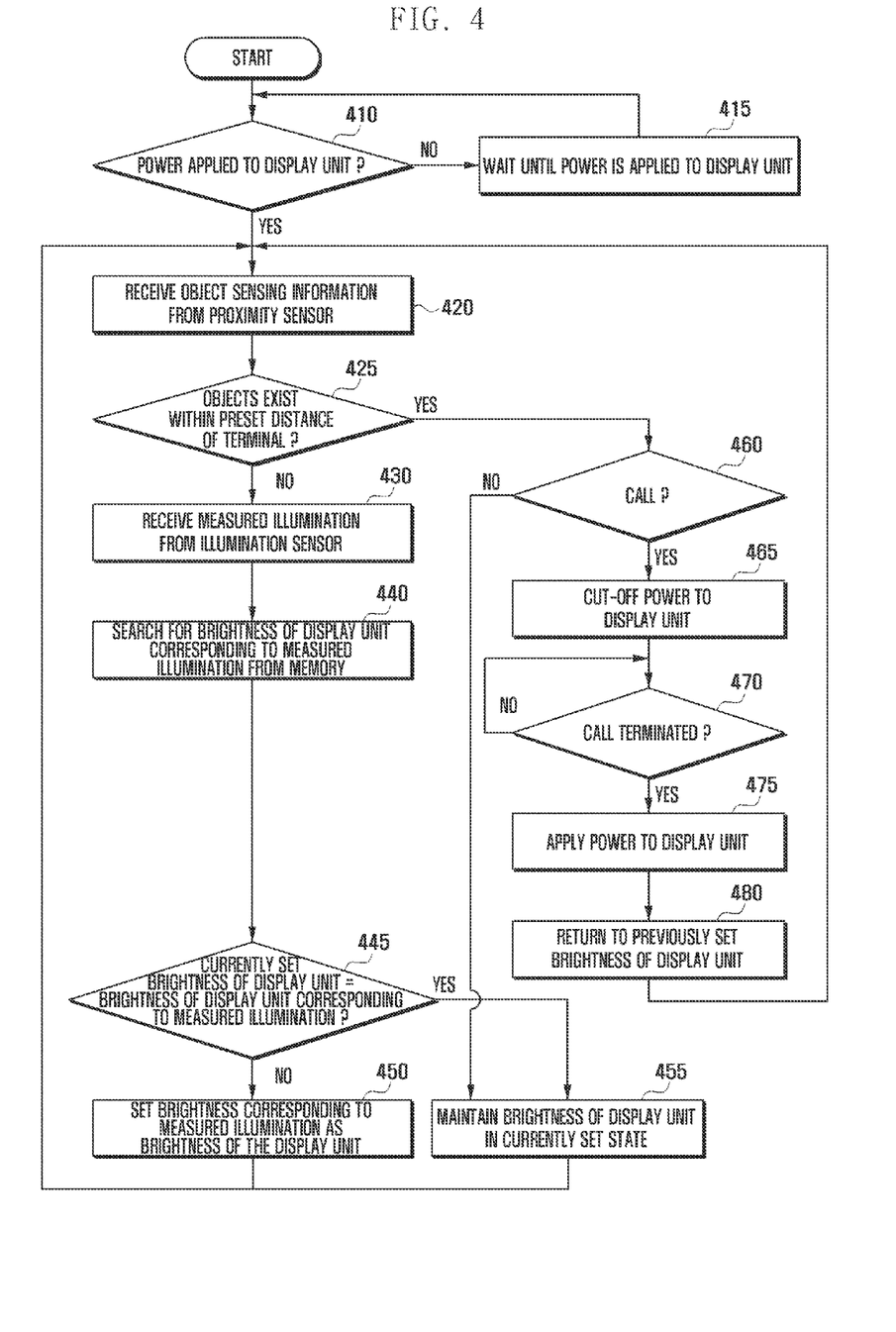
FIG. 4 is a flowchart illustrating a brightness control method according to a second exemplary embodiment of the present invention.

FIG. 4 is a flowchart illustrating a brightness control method according to a second exemplary embodiment of the present invention.

A controller 160 determines whether power is applied to a display unit 132 in step 410. That is, the controller 160 determines whether the display unit 132 is turned-on. When an event occurs, for example, when the terminal 100 receives an input from or a call request from a user while power to the display unit 132 is cut-off in an idle state, it may apply power to the display unit 132 that enables the display unit 132 to display information. If the controller 160 determines that the power is applied to the display unit 160 at step 410, the process proceeds to step 420. Conversely, if the power is not applied to the display unit 160, the controller 160 waits until the power is applied to the display unit 132 in step 415 and then returns to step 410.

The proximity determining unit 162 of the controller 160 receives object detecting information from the proximity sensor 180 in step 420. The proximity sensor 180 detects whether an object exists within a preset distance of a terminal 100 periodically or under the control of the proximity determining unit 162, and transfers detecting information to the proximity determining unit 162. Here, the preset distance is a distance for determining whether a user shields the illustration sensor 170, and for example may be 1 cm. Here, since the illustration sensor 170 is determined to be detected by the proximity detecting of the proximity sensor 180, the proximity sensor 180 and the illumination sensor 170 are integrally implemented or the proximity sensor 180 and the illumination sensor 170 are located within a preset distance, for example, 0.5 cm to improve performance.

The proximity determining unit 162 determines whether an object exists within a preset distance of the terminal 100 according to the received object detecting information in step 425. When the object exists within a preset distance of the terminal 100, the proximity determining unit 162 determines that the user is covering the illumination sensor 170 and performs the next operation according to whether the terminal 100 is calling in step 460. Conversely, when the object does not exist within the preset distance of the terminal 100, the process proceeds to step 430. At this time, the proximity determining unit 162 transfers information indicating that the object does not exist within the preset distance of the terminal 100 to the brightness determining unit 161.

A brightness determining unit 161 of the controller 160 receives measured illumination from an illumination sensor 170 in step 430. As illustrated above, the illumination sensor 170 may measure illumination periodically or under the control of the bright determining unit 161 and transfer the measured illumination to the brightness determining unit 161.

The brightness determining unit 161 of the controller 160 searches for a reference brightness of the display unit 132 corresponding to the measured illumination from a brightness table of a memory 150 in step 440. The brightness determining unit 161 may search for at least one of an allowable screen brightness in the measured illumination or a screen brightness used when resetting the illumination. Referring to FIG. 2A and FIG. 2B, as illustrated previously, "allowable screen brightness" and "resetting screen brightness" with respect to illumination are stored in the brightness table. The foregoing exemplary embodiment has illustrated that IDs of screen brightness, control values for implementing the screen brightness, and IDs of the control values in the place of the screen brightness may be used in the brightness table.

The brightness determining unit 161 determines whether currently set brightness of the display unit 132 is identical to the found reference brightness of the display unit 132 corresponding to the measured illumination in step 445.

Referring to an example of FIG. 2A, it is assumed that peripheral illumination is measured with 40 lx. In this case, allowable screen brightness ranges from 0.06 cd/cm$^2$ to 0.08 cd/cm$^2$.

The currently set brightness of the display unit 132 ranging from 0.06 cd/cm$^2$ to 0.08 cd/cm$^2$ indicates a case where the currently set brightness of the display unit 132 is identical with the brightness of the display unit 132 corresponding to the measured illumination. When a user determines that current brightness of the display unit 132 is suitable, and the currently set brightness of the display unit 132 is maintained in step 455. Thereafter, the process returns to step 420.

Conversely, when the currently set brightness of the display unit 132 is 0.09 cd/cm$^2$, this indicates a case where a currently set brightness of the display unit 132 differs from a brightness of the display unit 132 corresponding to the measured illumination. In this case, because the currently set brightness of the display unit 132 is too bright or dark, the process proceeds to step 450. At this time, the brightness determining unit 161 transfers information indicating that the currently set brightness of the display unit 132 differs from the found reference brightness of the display unit 132 corresponding to the measured illumination to the proximity determining unit 162. The brightness setting unit 163 sets the found reference brightness corresponding to the measured illumination as the brightness of the display unit 132 in step 450. For example, if the peripheral illumination measured by the illumination sensor 170 is 90 lx, the brightness setting unit 163 sets the brightness of the display unit 132 to 0.09 cd/cm$^2$. Thereafter, the process proceeds to step 420.

In a modified exemplary embodiment of the present invention, step 440 and step 445 may be substituted by a construction that compares illumination measured at a recent measuring time point with that of a previously changed time point of a display unit at the recent measuring time point, and determines whether change in brightness of the display unit is needed according to the comparison of the illumination. However, there should be a reference for determining that the brightness of the display unit becomes unsuitable as the illumination changes in order to apply this exemplary embodiment. For example, if the brightness of the display unit differs from a previously changed brightness of the display unit by more than 20 lx, it may be determined to need to be changed.

The controller 160 determines whether a terminal 100 is currently executing a call function in step 460. Because the call function is executed under the control of the controller 160, the controller 160 may easily determine that the call function of the terminal is executed. If the terminal 100 is not currently executing the call function, because the user simply covers the illumination sensor 170, the controller 160 maintains brightness of the display unit 132 in a currently set state in step 455. Conversely, if the terminal 100 is currently executing a call function, the controller 160 cuts-off power of the display unit 132 in step 465. This is why it is unnecessary to display the display unit 132 during calling. However, in the case of an image call, separate input of a user, or the occurrence of an event, the power of the display unit 132 may not be cut-off. The controller 160 determines whether calling is terminated in step 470. When the calling is terminated, the controller 160 applies power to the display unit 132 in step 475. Subsequently, in step 480, the controller 160 returns brightness of the display unit 132 to a previously set brightness, namely, a brightness set in the display unit 132 at step 425.

Figure 5:
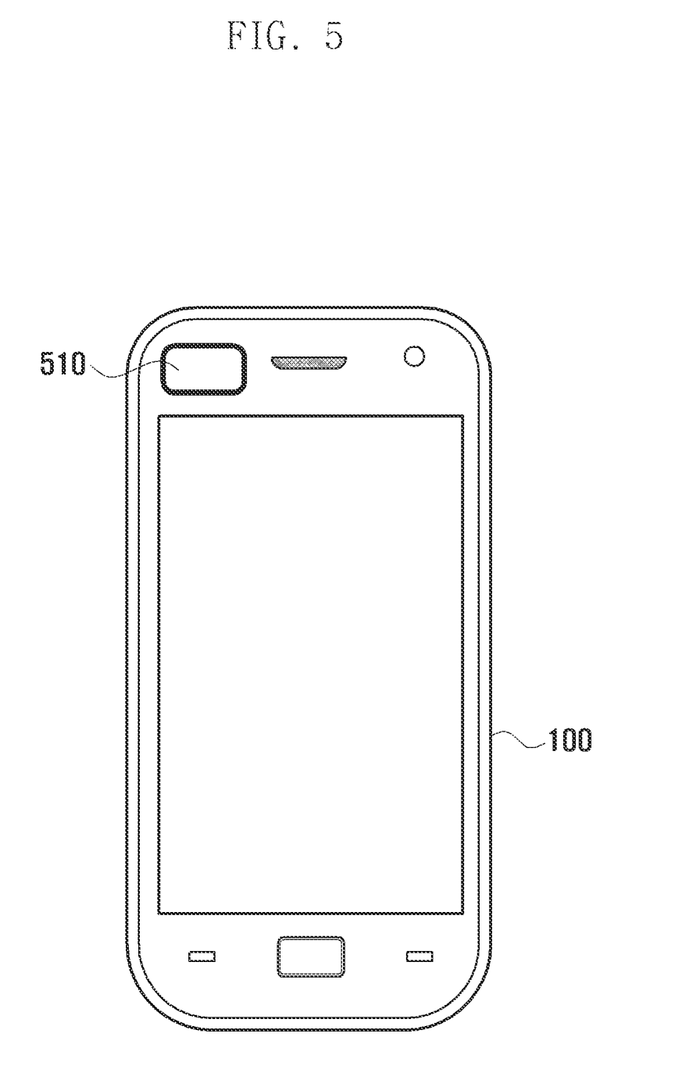
FIG. 5 is a front view illustrating a terminal according to an exemplary embodiment of the present invention.

FIG. 5 is a front view illustrating a terminal according to an exemplary embodiment of the present invention. An integral sensor 510 of an illumination sensor 170 and a proximity sensor 180 is disposed at an upper portion of the terminal 100. Hereinafter, the integral sensor 510 of an illumination sensor 170 and a proximity sensor 180 refers to an integral sensor 510.

Figure 6:
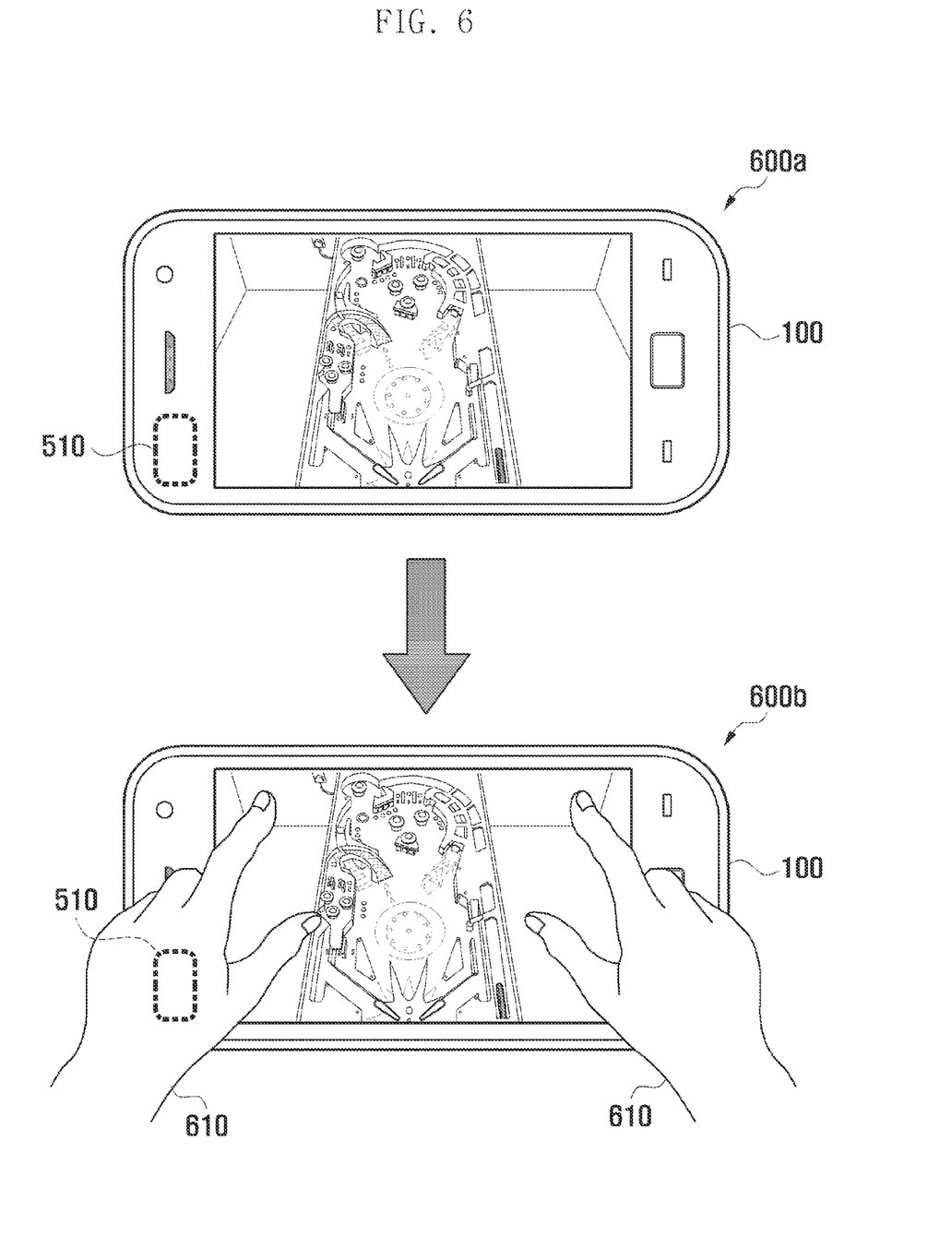
FIG. 6 is a view illustrating an example of a terminal according to an exemplary embodiment of the present invention.

FIG. 6 is a view illustrating an example of a terminal according to an exemplary embodiment of the present invention.

Step 600a is a step in which a user executes a game. In step 600a, since a user does not move a finger near the terminal 100, the illumination sensor 170 of the integral sensor 510 is not covered. Accordingly, the illumination sensor 170 measures illumination according to a change in a peripheral illumination such that brightness of the screen may change. In step 600b, a user moves the finger 610 near the terminal 100. At this time, the integral sensor 510 is shielded by a finger of the user 610. Owing to this, the illumination sensor 170 of the integral sensor 510 may detect that the peripheral illumination becomes dark. However, simultaneously, the proximity sensor 180 of the integral sensor 510 detects that an object exists around the terminal 100, and accordingly, may maintain current brightness of the display unit 132.

In the related art, if the user covers the illumination sensor 170 with a finger, the display unit 132 becomes dark. However, although a user covers the illumination sensor 170 with a finger, an exemplary embodiment of the present invention may maintain brightness of the display unit 132 to prevent inconvenience of the user.

In this case, it will be appreciated that respective blocks of processing flowcharts and a combination thereof may be performed by computer program instructions.

Since computer program instructions may be mounted in a processor of a universal computer, a special computer or other programmable data processing equipment, instructions performed through a processor of a computer or other programmable data processing equipment generates means for performing functions described in block(s) of the flowcharts. Since the computer program instructions may be stored in a computer available or computer readable memory capable of orienting a computer or other programmable data processing equipment to implement functions in a specific scheme, instructions stored in the computer available or computer readable memory may produce manufacturing articles involving an instruction means executing functions described in block(s) of flowcharts. Because the computer program instructions may be mounted on a computer or other programmable data processing equipment, a series of operation steps are performed in the computer or other programmable data processing equipment to create a process executed by the computer such that instructions performing the computer or other programmable data processing equipment may provide steps for executing functions described in block(s) of flowcharts.

Further, each block may indicate a part of a module, a segment, or a code including at least one executable instruction for executing specific logical function(s). It should be noticed that several execution examples may generate functions described in blocks out of an order. For example, two continuously shown blocks may be simultaneously performed, and the blocks may be performed in a converse order according to corresponding functions.

As used in this embodiment, the term "~ unit" refers to software or a hardware structural element such as a Field-Programmable Gate Array (FPGA) or an Application-Specific Integrated Circuit (ASIC), and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one Central Processing Unit (CPU) in a security multimedia card.

A terminal according to an exemplary embodiment of the present invention may be one of portable electronic devices such as a Personal Digital Assistant (PDA), a navigation system, a digital broadcasting receiver, and a Portable Multimedia Player (PMP).

A portable terminal according to an embodiment of the present invention is applicable to a Bar type portable terminal, a Flip type portable terminal, a Sliding type portable terminal, a Rotating type portable terminal, or a combination thereof.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A terminal comprising:
   an illumination sensor for measuring peripheral illumination of the terminal;
   a proximity sensor for detecting an object within a preset distance;
   a memory for storing a brightness table including data for controlling brightness of a display unit corresponding to the measured illumination;
   the display unit for displaying and for changing a brightness of the display unit under control of a controller; and
   the controller for controlling the display unit to change the brightness according to the measured illumination and the brightness table when the object is not detected.

2. The terminal of claim 1, wherein the controller controls the display unit to maintain a set brightness of the display unit when the object is detected.

3. The terminal of claim 2, wherein the controller sets the brightness of the display unit according to a reference brightness when the set brightness differs from the reference brightness corresponding to the measured illumination and the object is not detected.

4. The terminal of claim 3, wherein the controller comprises:
- a brightness determining unit for searching for the reference brightness from the brightness table to determine whether the set brightness is identical to the reference brightness;
- a proximity determining unit for determining whether an object is detected within a preset distance when the set brightness differs from the reference brightness; and
- a brightness setting unit for setting the reference brightness as the brightness of the display unit when the object is not detected.

5. The terminal of claim 4, wherein the brightness setting unit maintains the brightness of the display unit when the set brightness is identical to the reference brightness or the object is detected.

6. The terminal of claim 2, wherein the controller controls to cuts-off power to the display unit when the object is detected and the terminal is calling.

7. The terminal of claim 6, wherein, after the controller controls to cut-off power to the display unit, the controller controls to apply power to the display unit when the calling is terminated and the brightness setting unit sets the brightness of the display unit to a previously set brightness of the display unit.

8. The terminal of claim 2, wherein the controller compares the measured illumination with illumination when brightness of the display unit was previously changed and sets the brightness of the display unit according to a reference brightness when the measured illumination changes by greater than a set value and the object is not detected.

9. The terminal of claim 2, wherein the illumination sensor and the proximity sensor are located within a preset distance.

10. The terminal of claim 2, wherein the illumination sensor and the proximity sensor are integrally implemented.

11. A method for controlling brightness of a display unit in a terminal, the method comprising:
- measuring peripheral illumination of the terminal;
- determining whether an object is detected within a preset distance; and
- controlling brightness of the display unit according to the measured illumination when the object is not detected within the preset distance.

12. The method of claim 11, further comprising:
- maintaining a set brightness of the display unit when the object is detected.

13. The method of claim 11, wherein the controlling of the brightness of the display unit comprises setting a reference brightness as the brightness of the display unit when the set brightness differs from the reference brightness corresponding to the measured illumination and the object is not detected.

14. The method of claim 11, wherein the controlling of the brightness of the display unit comprises:
- searching for the reference brightness corresponding to the measured illumination from a brightness table to determine whether the set brightness of the display unit is identical to a reference brightness;
- determining whether the object is detected within a preset distance when the set brightness differs from the reference brightness; and
- setting the reference brightness as the brightness of the display unit when the object is not detected.

15. The method of claim 14, wherein the controlling of the brightness of the display unit comprises maintaining the brightness of the display unit when the set brightness is identical to the reference brightness or the object is detected.

16. The method of claim 11, further comprising:
- cutting-off power to the display unit when the object is detected and the terminal is calling.

17. The method of claim 16, further comprising:
- after power to the display unit is cut-off, applying power to the display unit when the terminal terminates the calling and setting the brightness of the display unit to a previously set brightness of the display unit.

18. The method of claim 11, wherein the controlling of the brightness of the display unit comprises comparing the measured illumination with an illumination when brightness of the display unit was previously changed and setting the brightness of the display unit according to a reference brightness when the measured illumination changes greater than a set value and the object is not detected.

* * * * *